United States Patent
Piehler et al.

(10) Patent No.: US 9,581,888 B2
(45) Date of Patent: Feb. 28, 2017

(54) PROJECTION APPARATUS

(71) Applicant: Young Optics Inc., Hsinchu (TW)

(72) Inventors: Eberhard Piehler, Lehesten (DE); Gudran Schroeter, Jena (DE); Guenther Benedix, Jena (DE); Gertrud Blei, Jena (DE); Thomas Maack, Rastenberg (DE)

(73) Assignee: YOUNG OPTICS INC., Hsinchu (TW)

( * ) Notice: Subject to any disclaimer, the term of this patent is extended or adjusted under 35 U.S.C. 154(b) by 113 days.

(21) Appl. No.: 14/626,752

(22) Filed: Feb. 19, 2015

(65) Prior Publication Data

US 2015/0160544 A1 Jun. 11, 2015

Related U.S. Application Data

(63) Continuation of application No. 12/524,535, filed as application No. PCT/EP2008/000596 on Jan. 25, 2008, now Pat. No. 8,992,025.

(30) Foreign Application Priority Data

Jan. 25, 2007 (DE) .................. 10 2007 003 797
Feb. 7, 2007 (DE) .................. 10 2007 006 094

(51) Int. Cl.
*G02B 17/06* (2006.01)
*G03B 21/28* (2006.01)
*G02B 5/08* (2006.01)
*G02B 17/08* (2006.01)
(Continued)

(52) U.S. Cl.
CPC ............... *G03B 21/28* (2013.01); *G02B 5/08* (2013.01); *G02B 17/0605* (2013.01); *G02B 17/0615* (2013.01); *G02B 17/0812* (2013.01); *G02B 17/0816* (2013.01); *G02B 17/0832* (2013.01); *G03B 21/10* (2013.01); *G02B 13/16* (2013.01)

(58) Field of Classification Search
CPC ...... G02B 17/00; G02B 17/008; G02B 17/08; G02B 17/06; G02B 17/0605; G02B 17/0621; G02B 27/0025; G03B 21/18; G03B 21/28
See application file for complete search history.

(56) References Cited

U.S. PATENT DOCUMENTS

| 5,499,067 A | 3/1996 | Shibazaki |
| 6,406,150 B1 | 6/2002 | Burstyn |
| 6,439,726 B1 | 8/2002 | Piehler |

(Continued)

FOREIGN PATENT DOCUMENTS

| CN | 1770005 A | 5/2006 |
| DE | 19832317 C1 | 5/2000 |

(Continued)

*Primary Examiner* — William C Dowling
(74) *Attorney, Agent, or Firm* — Muncy, Geissler, Olds & Lowe, P.C.

(57) ABSTRACT

A projection apparatus includes an image-producing element and projection optics. The image-producing element produces at least one image, and the projection optics has free-form areas for magnifying and reflecting the image toward an viewer for observation. The projection optics includes at least a first mirror and a second mirror, the image is reflected by the first mirror and the second mirror in succession, no deflection mirror is disposed between the viewer and the second mirror, and the first mirror and the second mirror are in the form of a non-rotationally symmetrical system.

19 Claims, 5 Drawing Sheets

(51) Int. Cl.
*G03B 21/10* (2006.01)
*G02B 13/16* (2006.01)

(56) References Cited

U.S. PATENT DOCUMENTS

| | | |
|---|---|---|
| 6,612,701 B2 | 9/2003 | Westort et al. |
| 6,626,542 B2 | 9/2003 | Baba et al. |
| 6,771,427 B1 | 8/2004 | Matsuo |
| 6,994,442 B2 | 2/2006 | Kurematsu et al. |
| 7,101,052 B2 | 9/2006 | Sunaga |
| 7,441,908 B2 | 10/2008 | Takaura et al. |
| 2004/0141157 A1 | 7/2004 | Ramachandra |
| 2006/0056037 A1 | 3/2006 | Kuwa |
| 2007/0184368 A1 | 8/2007 | Nishikawa et al. |
| 2007/0201009 A1 | 8/2007 | Suzki et al. |

FOREIGN PATENT DOCUMENTS

| | | |
|---|---|---|
| EP | 1452907 A1 | 9/2004 |
| EP | 1806612 A1 | 7/2007 |
| GB | 2367905 A | 4/2002 |
| WO | WO-01/01546 M | 1/2001 |
| WO | WO-2006/043666 A1 | 4/2006 |

PROJECTION APPARATUS

CROSS-REFERENCE TO RELATED APPLICATIONS

This application is a continuation of U.S. application Ser. No. 12/524,535, filed Sep. 9, 2009, which is a National Stage filing of International Patent Application No. PCT/EP2008/000596, filed Jan. 25, 2008, which claims priority to German Application No. 10/2007/003797.1, filed Jan. 25, 2007, and German Application No. 10/2007/006094.9, filed Feb. 7, 2007, the entire disclosures of which are incorporated herein by reference.

BACKGROUND OF THE INVENTION

1. Field of the Invention

The present invention relates to a rear projection apparatus having a screen, projection optics and an image module for production of an image which is projected by means of the projection optics from the rear onto the screen, such that a viewer who is located in front of the screen can perceive the image which is projected onto the screen. The invention also relates to a method for a rear projection apparatus such as this.

2. Description of the Related Art

In the case of rear projection apparatuses such as these, the physical depth and the foot height should be as low as possible. The physical depth can be reduced by using optics with a large image field offset. However, in this case, very large incidence angles occur on the screen which, in the case of a screen which has a transmissive Fresnel pane, must not exceed a certain incidence angle thus disadvantageously restricting the capability to minimize the physical depth. In order to achieve a reduced physical depth, the screen frequently has a reflective Fresnel pane, by means of which the necessary beam deflection is carried out on the screen. However, since the minimum incidence angle in the case of the reflective Fresnel panes must not be less than about 40°, this means that this incidence angle must be selected even at the point which is closest to the axis of the screen (viewed towards the projection optics), as a result of which the foot height is disadvantageously relatively large. Fresnel structures result in increased light losses even at angles of less than 55°.

In EP 1 452 907 A1, the Fresnel pane is partially reflective and partially transmissive, in order to minimize the foot height. However, this leads to the disadvantage that unacceptable image artifacts occur in the transitional area between the reflective area and the transmissive area of the Fresnel pane.

BRIEF SUMMARY OF THE INVENTION

Against this background, the object of the invention is to develop a rear projection apparatus of the type mentioned initially so as to achieve a good image display on the screen with a small physical depth and foot height of the rear projection height.

According to the invention, the object is achieved in that the projection optics have a reflective Fresnel mirror. This Fresnel mirror makes it possible to set a greater deflection of the light beams in the area remote from the axis (that is to say for the upper area of the screen), as a result of which the maximum incidence angle on the screen is reduced and can be set such that, for example in the case of a screen which has a transmissive Fresnel pane, it is no greater than the maximum permissible incidence angle for the transmissive Fresnel pane. It is thus possible to achieve a small foot height for the rear projection apparatus while maintaining the physical depth at the same time wherein, furthermore, an excellent image display is achieved since the screen can have just one transmissive Fresnel pane. In particular, the necessary beam deflection on the screen can be achieved exclusively by one transmissive Fresnel pane of the screen. The transmissive Fresnel pane may extend over the entire screen.

Furthermore, according to the invention, the object is likewise achieved by the projection optics having a combination of mirrors with refractive power, that is to say at least one first aspherical mirror and one second aspherical mirror. Utilization of the capability to provide the shape of the mirror with an aspherical component makes it possible to reduce the number of optical elements in the projection optics. In particular, the second aspherical mirror in the projection optics, preferably directly in front of the transmissive Fresnel pane, makes it possible to deflect the light beams more strongly in the area remote from the axis, that is to say for the upper area of the screen, as a result of which the maximum incidence angle on the screen is reduced and can be set such that, for example in the case of a screen which has a transmissive Fresnel pane, it is no greater than the maximum permissible incidence angle for a transmissive Fresnel panel. It is thus possible to achieve a small foot height of the rear projection apparatus while maintaining the physical depth at the same time, wherein, furthermore an excellent image display is achieved since the screen may have just one transmissive Fresnel pane. In particular, the necessary beam deflection on the screen can be achieved exclusively by one transmissive Fresnel pane of the screen. The transmissive Fresnel pane may extend over the entire screen.

In particular, it is possible not to arrange any further deflection mirror between the screen and the Fresnel mirror. The Fresnel mirror therefore provides the last beam path folding before the Fresnel pane. It is likewise possible not to arrange any further deflection mirror between the screen and the second aspherical mirror. The second aspherical mirror therefore provides the final beam path folding before the Fresnel pane.

Furthermore, the Fresnel mirror or the second aspherical mirror may be designed such that when the image is projected onto the screen, the incidence angle is no greater than 60° over the entire screen. This ensures that the transmissive Fresnel pane can be used for the screen.

Furthermore, the Fresnel mirror or the second aspherical mirror preferably still has positive power. This makes it possible to reduce the number of optical elements in the projection optics.

The projection optics may be designed together with the Fresnel pane as a rotationally symmetrical system whose image field is used only on one side and does not contain the optical axis of the system. It is thus possible to reduce the physical depth of the rear projection apparatus. The projection optics may contain two flat deflection mirrors for optimum spatial matching of the projection optics to the small physical depth and foot height.

The projection optics may also be designed as a non-rotationally symmetrical system and, for example, may contain free-form areas. In this case, free-form areas means non-spherical areas which are not rotationally symmetrical.

In particular, the apparatus has a housing which supports the screen wherein all of the optical elements of the projection optics apart from the Fresnel mirror, or the second aspherical mirror, are arranged in the housing underneath the lower edge of the screen. It is thus possible to achieve a small physical depth.

In the rear projection apparatus, the Fresnel minor may have a multiplicity of Fresnel structures, which are arranged concentrically relative to a center, extend along a first direction, and each comprise a mirror surface for beam path folding. The Fresnel structures are in this case preferably each in the form of a ring section in order to produce the desired image field offset.

In particular, the mirror surfaces of the Fresnel structures may be designed such that they are not curved on a section plane at right angles to the first direction. This allows the Fresnel structures to be produced more easily. It is, of course, also possible to design the mirror surfaces to be curved on the section plane, as a result of which the mirror surfaces of the Fresnel structures themselves also have an optical effect which goes beyond pure radiation deflection. The curved form of the mirror surfaces can also be chosen so as to compensate for imaging errors. In particular, it is possible to compensate for those imaging errors which occur as a result of the finite width of the Fresnel structures (extent at right angles to the first direction).

The angle between the mirror surface of the Fresnel structures on the section plane and the normal to the plane on which the Fresnel structures lie preferably decreases as the distance from the center increases. In the case of the curved embodiment of the mirror surfaces, the angle is understood to be the angle between a tangent (preferably at the centroid) of the curved mirror surface and the normal to the plane. Furthermore, the width of the Fresnel structures at right angles to the first direction also preferably decreases as the distance from the center increases. This makes it possible to produce a Fresnel mirror with the desired characteristics.

The Fresnel structures may be formed on a planar or curved plane. If the plane is planar, it is simple to produce the Fresnel mirror. If embodied on a curved plane, the curvature can advantageously be used, for example, to compensate for imaging errors in the projection optics.

The image module may have a reflective or transmissive image-producing element, such as a tilting mirror matrix, an LCD element or an LCoS element. The image-producing element may be self-illuminating, or the image module contains a light source and optics for illumination of the image-producing element. The rear projection apparatus may contain a control unit for operating the image module.

The rear projection apparatus can advantageously be in the form of projection optics in the field lens design, or may have a field lens structure. One field lens structure which can be used advantageously for the rear projection apparatus according to the application is, for example, described in DE 19832317C1 and the corresponding U.S. Pat. No. 6,439,726, whose entire disclosure content is intended to be the subject matter of the following application. This field lens structure and the second aspherical mirror allow a good image display to be achieved on the screen, with a small physical depth and foot height of the rear projection height.

Furthermore, a projection method is provided for a rear projection apparatus having a screen which has a transmissive Fresnel pane and has a front face and rear face, in which an image is projected via a reflective Fresnel mirror or a second aspherical mirror from the rear onto the screen, to be precise onto the rear face of the screen, such that a viewer who is located in front of the screen can perceive the image projected on the screen, wherein the image which is projected onto the rear face of the screen can be perceived on the front face of the screen. This method makes it possible to make the rear projection apparatus available with a small physical depth and foot height.

In particular, it is possible not to arrange any further deflection mirror between the screen and the Fresnel mirror or the second aspherical mirror, such that the Fresnel mirror or the second aspherical mirror provides the last beam path folding before the screen.

The screen may have a transmissive Fresnel pane, which preferably extends over the entire screen.

Furthermore, the Fresnel mirror or the second aspherical mirror may be designed such that, when the image is projected onto the screen, the incidence angle is no greater than 60° over the entire screen. It is thus possible for the transmissive Fresnel pane to extend over the entire screen, thus making it possible to achieve an excellent image display.

The Fresnel mirror may be part of projection optics which, together with the Fresnel pane, are in the form of a rotationally symmetrical system whose image field is used on only one side and does not contain the optical axis of the system. It is thus possible to achieve the necessarily large image field offset in order to achieve a small physical depth for the projection apparatus.

Furthermore, the rear projection apparatus may have a housing which supports the screen with all of the other optical elements of the projection optics apart from the Fresnel mirror, which is part of the projection optics, being arranged in the housing underneath the lower edge of the screen.

The Fresnel mirror may have a multiplicity of Fresnel structures which are arranged concentrically relative to a center, extend along a first direction, and each comprise a mirror surface for beam path folding. The mirror surfaces may be designed such that they are not curved on a section plane at right angles to the first direction. Alternatively, it is possible for the mirror surfaces to be designed to be curved on the section plane, therefore also providing a further optical effect in addition to beam path folding.

In particular, the angle between the mirror surfaces on the section plane and the normal to the section plane on which the Fresnel structures lie may decrease as the distance from the center increases. In addition, the width of the Fresnel structures at right angles to the first direction may decrease as the distance from the center increases. This results in a Fresnel mirror with the desired characteristics.

The Fresnel structures may be formed on a planar plane or a curved plane.

Furthermore, if some of the imaging elements of the projection optics, for example output lenses which are arranged directly in front of the second aspherical mirror, have the same optical axis as the second aspherical mirror, then this measure simplifies the overall optical configuration and thus the overall geometric symmetry, as a result of which, because the optical axis is identical, there is no need to use compensation or equalization optics between the output imaging elements of the projection optics and the second aspherical mirror, which would, if appropriate, have to be used to compensate for any offset between the respective optical axes.

It has been found to be particularly advantageous for both the output imaging elements of the projection optics, the first aspherical mirror and the second aspherical mirror to have the same optical axis, thus resulting in the overall imaging optics representing a simple design. This likewise eliminates additional compensation optics, which may be subject to errors.

If the projection optics contain a deflection mirror, which, in particular, is provided between the output imaging elements, and makes it possible for the angle between the optical axis of the imaging elements of the projection optics before the deflection mirror and the optical axis of the imaging elements of the projection optics after the deflection mirror to be less than or equal to 90°, then the projection optics are optimally integrated in the rear projection apparatus. The advantageous introduction of the deflection mirror into the projection optics means that, for example, parts of the projection optics together with an illumination module, for example, can be positioned underneath the lower edge of the screen but above the optical axis of the aspherical first mirror, to be precise in such a way that parts of the projection optics are positioned at right angles, or at an angle of less than 90° to the optical axis of the second aspherical mirror. These measures mean that the foot height of the rear projection apparatus can be set at virtually zero, or the physical depth of the rear projection apparatus is governed only by the size of the first aspherical mirror.

It is self-evident that the features mentioned above and those which are still to be described in the following text can be used not only in the stated combinations but also in other combinations or on their own without departing from the scope of the present invention.

BRIEF DESCRIPTION OF THE DRAWINGS

The invention will be described and explained in more detail in the following text with reference to one exemplary embodiment and in conjunction with the attached drawings, in which.

DETAILED DESCRIPTION OF THE INVENTION

Figure 1:
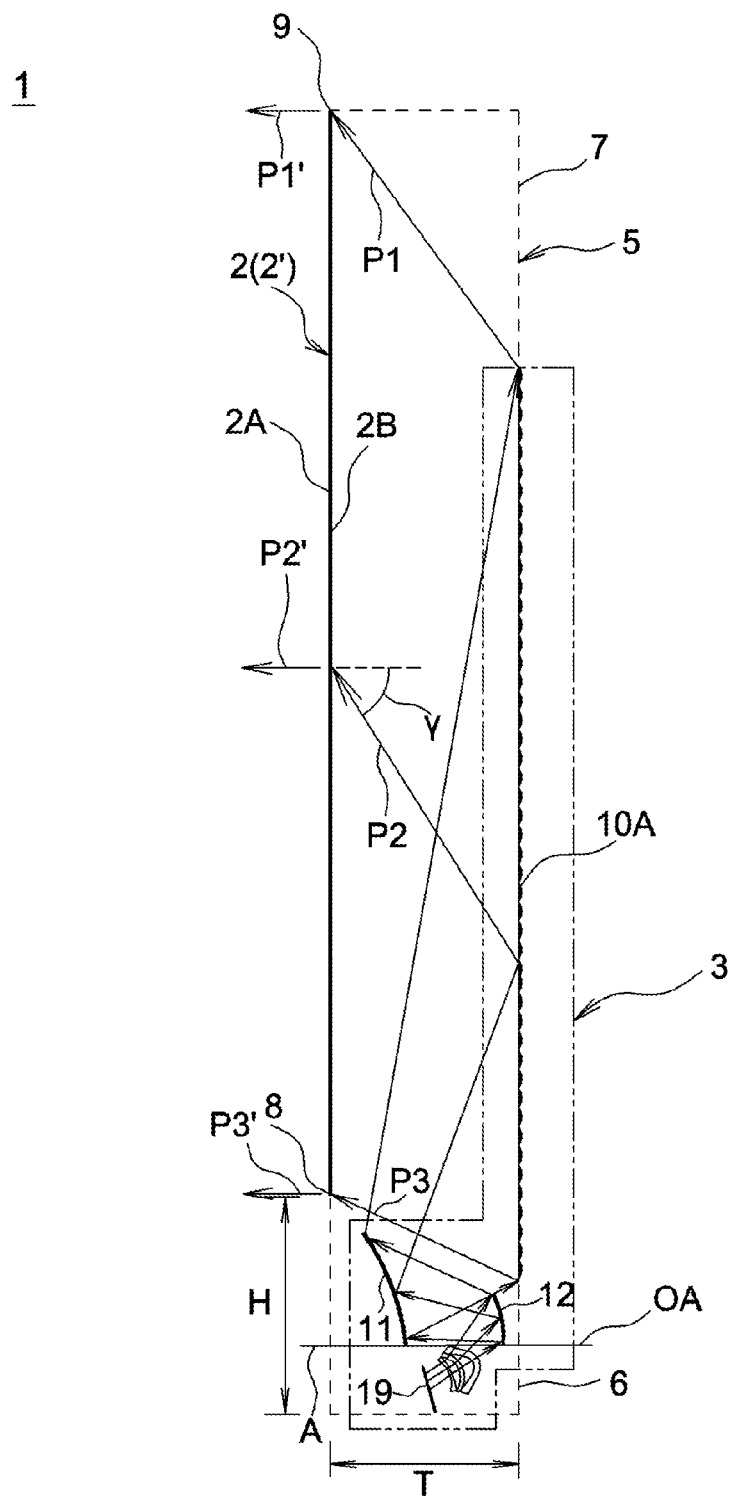
FIG. 1 shows a section view of the rear projection apparatus according to the invention with a Fresnel mirror.
Figure 2:
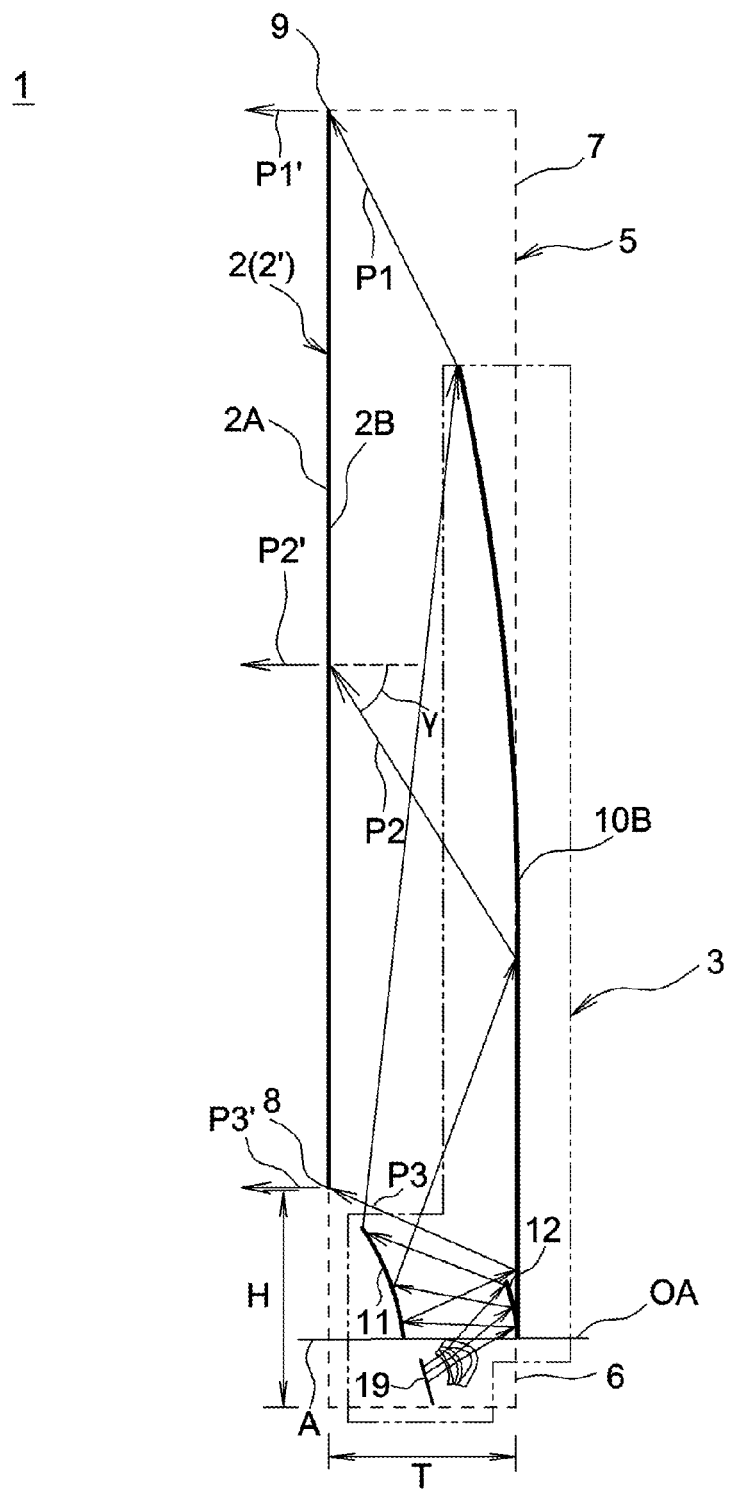
FIG. 2 shows a section view of the rear projection apparatus according to the invention with a second aspherical mirror.

In the embodiment shown in FIGS. 1 and 2, the rear projection apparatus 1 comprises a screen 2 with a front face (2A) and a rear face (2B), projection optics 3, an image module 4 and a housing 5, which is represented by dashed lines in FIG. 1.

The projection optics 3 are arranged in the housing 5 of the rear projection apparatus 1, with the housing 5 having a foot part 6 and a screen part 7. The depth T of the rear projection apparatus is about 140 to 150 mm or 150 to 160 mm, and the front height H of the foot part is only about 140 mm. The height of the screen 2, which is illustrated as being rectangular, that is to say the distance from the lower edge 8 to the upper edge 9 of the screen 2 is in this case about 747 mm. The width of the screen (at right angles to the plane of the drawing in FIG. 1) is about 1328 mm which means that the screen 2 has a diagonal of about 1524 mm.

Figure 3:
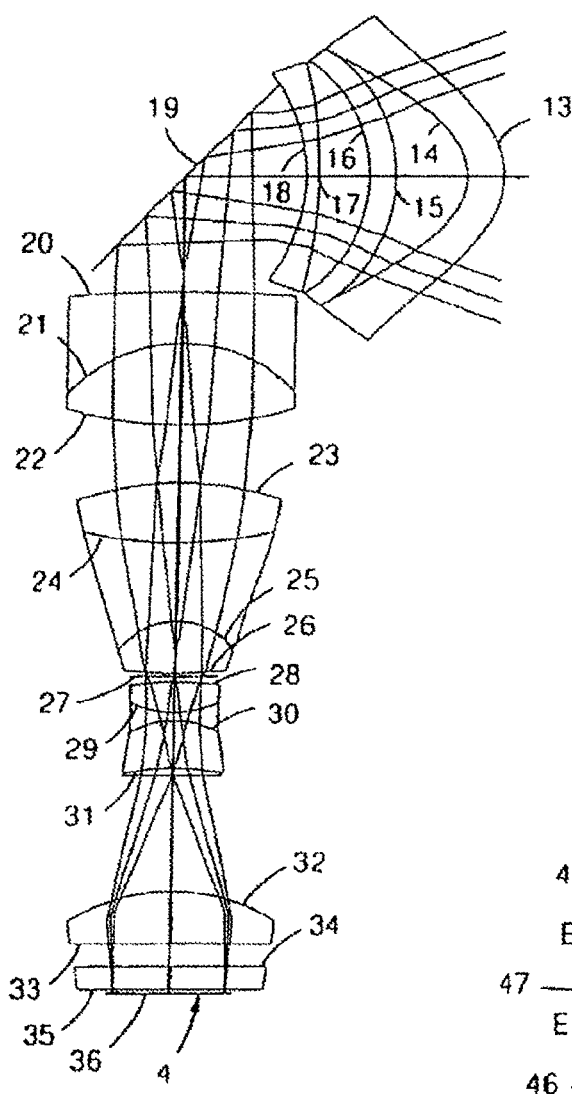
FIG. 3 shows a lens section of a part of the projection optics 3 of the rear projection apparatus as shown in FIGS. 1 and 2.

The projection optics 3 of the rear projection apparatus 1, or the projection optics 3 with a field lens structure, are illustrated partially in FIGS. 1 and 2 and partially in FIG. 3. This is because of the fact that the elements of the projection optics 3 which are shown from the image module 4 to the deflection mirror 19 in FIG. 3 are located vertically and above the plane of the drawing in FIG. 1, in the illustration in FIGS. 1 and 2.

The following tables 1 and 2 show the distances and radii of curvature of the surfaces 10 to 36 of the elements of the projection optics 3 when using a Fresnel mirror (Table 1) and when using a second aspherical mirror (Table 2). When two surfaces bound a lens material (and not air), the refractive power and the Abbe dispersion number are also quoted for the material. Radii, thickness distances and air distances are quoted in millimeters in the table. In the surface characteristic column S represents a mirror, A an aspherically curved surface and AF an aspherically curved Fresnel surface. In the rows between two surfaces, the respective distances are quoted in the "thickness and air distances" column, with the distance from the Fresnel pane 2' to the Fresnel mirror 10A being indicated by 140 in the first row of Table 1, and the distance from the Fresnel pane 2' to the second aspherical mirror 10B being indicated by 150 in Table 2.

TABLE 1

| Surface | Radii | Thickness and air distances | Refractive powers $n_e$ | Abbe dispersion $v_e$ | Surface characteristic |
|---|---|---|---|---|---|
| 10A | −2900.45 | 140 | | | S, AF |
| | | 82.99 | | | |
| 11 | 35.857 | | | | S, A |
| | | 80.75 | | | |
| 12 | Infinite | | | | S |
| | | 28.82 | | | |
| 13 | 9.1526 | | | | A |
| | | 5.00 | 1.52743 | 56.3 | |
| 14 | 6.4903 | | | | A |
| | | 9.60 | | | |
| 15 | 18.596 | | | | |
| | | 3.66 | 1.85504 | 23.6 | |
| 16 | 17.286 | | | | |
| | | 7.03 | | | |
| 17 | 62.390 | | | | |
| | | 1.50 | 1.76859 | 26.3 | |
| 18 | 20.338 | | | | |
| | | 15.96 | | | |
| 19 | Infinite | | | | |
| | | 14.85 | | | |
| 20 | 194.18 | | | | |
| | | 6.63 | 1.74705 | 27.6 | |
| 21 | 20.607 | | | | |
| | | 10.55 | 1.68082 | 55.1 | |
| 22 | −53.895 | | | | |
| | | 7.72 | | | |
| 23 | 41.990 | | | | |
| | | 7.92 | 1.85504 | 23.6 | |
| 24 | −53.718 | | | | |
| | | 10.37 | 1.57047 | 42.5 | |
| 25 | 9.1639 | | | | |
| | | 6.94 | 1.63003 | 35.4 | |
| 26 | −57.414 | | | | |
| | | 0.41 | | | |
| 27 | Infinite | | | | Aperture |
| | | 0.77 | | | |
| 28 | 41.703 | | | | |
| | | 4.08 | 1.62033 | 63.0 | |
| 29 | −12.261 | | | | |

TABLE 1-continued

| Surface | Radii | Thickness and air distances | Refractive powers $n_e$ | Abbe dispersion $v_e$ | Surface characteristic |
|---|---|---|---|---|---|
|  |  | 1.13 | 1.85504 | 23.6 |  |
| 30 | 11.938 |  |  |  |  |
|  |  | 6.32 | 1.49845 | 81.1 |  |
| 31 | 31.740 |  |  |  |  |
|  |  | 16.52 |  |  |  |
| 32 | 25.520 |  |  |  |  |
|  |  | 6.98 | 1.80642 | 34.7 |  |
| 33 | Infinite |  |  |  |  |
|  |  | 2.95 |  |  |  |
| 34 | Infinite |  |  |  |  |
|  |  | 3.00 | 1.48900 |  | Cover glass |
| 35 | Infinite |  |  |  |  |
|  |  | 0.48 |  |  |  |
| 36 | Infinite |  |  |  |  |

TABLE 2

| Surface | Radii | Thickness and air distances | Refractive powers $n_e$ | Abbe dispersion $v_e$ | Surface character-istic |
|---|---|---|---|---|---|
|  |  | 150 |  |  |  |
| 10B | 33940.63 |  |  |  | S, A |
|  |  | 91.55 |  |  |  |
| 11 | 59.058 |  |  |  | S, A |
|  |  | 92.66 |  |  |  |
| 12 | Infinite |  |  |  | S |
|  |  | 44.78 |  |  |  |
| 13 | 40.493 |  |  |  | A |
|  |  | 2.67 | 1.52743 | 56.3 |  |
| 14 | 20.486 |  |  |  | A |
|  |  | 8.55 |  |  |  |
| 15 | 25.254 |  |  |  |  |
|  |  | 4.29 | 1.83932 | 36.9 |  |
| 16 | 29.851 |  |  |  |  |
|  |  | 6.13 |  |  |  |
| 17 | 286.45 |  |  |  |  |
|  |  | 0.71 | 1.55098 | 45.5 |  |
| 18 | 19.533 |  |  |  |  |
|  |  | 18.06 |  |  |  |
| 19 | Infinite |  |  |  | S |
|  |  | 21.45 |  |  |  |
| 20 | 204.19 |  |  |  |  |
|  |  | 2.85 | 1.69417 | 30.8 |  |
| 21 | 23.937 |  |  |  |  |
|  |  | 13.82 | 1.62287 | 60.1 |  |
| 22 | −49.337 |  |  |  |  |
|  |  | 16.25 |  |  |  |
| 23 | 29.630 |  |  |  |  |
|  |  | 6.93 | 1.79173 | 26.1 |  |
| 24 | −51.186 |  |  |  |  |
|  |  | 7.04 | 1.70442 | 29.9 |  |
| 25 | 8.4252 |  |  |  |  |
|  |  | 6.22 | 1.72733 | 29.0 |  |
| 26 | −84.469 |  |  |  |  |
|  |  | 0.44 |  |  |  |
| 27 | Infinite |  |  |  | Aperture |
|  |  | 0.23 |  |  |  |
| 28 | 33.553 |  |  |  |  |
|  |  | 4.78 | 1.62033 | 63.0 |  |
| 29 | −13.391 |  |  |  |  |
|  |  | 1.01 | 1.85504 | 23.6 |  |
| 30 | 13.058 |  |  |  |  |
|  |  | 3.60 | 1.83932 | 36.9 |  |
| 31 | 13.699 |  |  |  |  |
|  |  | 16.24 |  |  |  |
| 32 | 22.908 |  |  |  |  |
|  |  | 6.95 | 1.74678 | 49.1 |  |
| 33 | Infinite |  |  |  |  |
|  |  | 2.95 |  |  |  |
| 34 | Infinite |  |  |  |  |

TABLE 2-continued

| Surface | Radii | Thickness and air distances | Refractive powers $n_e$ | Abbe dispersion $v_e$ | Surface character-istic |
|---|---|---|---|---|---|
|  |  | 3.00 | 1.48900 |  | Cover glass |
| 35 | Infinite |  |  |  |  |
|  |  | 0.48 |  |  |  |
| 36 | Infinite |  |  |  |  |

In operation, an image is produced in a known manner by means of the image module 4, which in this case has a tilting minor matrix. The illumination unit which is required for image production as well as the control unit for operating the tilting mirror matrix are not illustrated, in order to simplify the illustration. The image which is produced by means of the image module 4 is projected by the projection optics 3 from the rear onto the screen 2, as is indicated by the arrows P1, P2 and P3. A viewer who is positioned in front of the rear projection apparatus (that is to say to the left of it, as seen in FIG. 1) can then perceive the image that is projected onto the screen. For this purpose, the screen 2 has a transmissive Fresnel pane 2' which extends over the entire screen area. The Fresnel pane 2' is designed such that the light from the screen propagates essentially at right angles to the screen plane, as is illustrated by the arrows P1', P2' and P3'. Transmissive Fresnel panes such as these are known to a person skilled in the art. The Fresnel pane 2' used here is rotationally symmetrical with respect to the axis A in FIG. 1, which coincides with the optical axis OA of the projection optics 3.

The screen 2 may also have a diffuser pane (not shown), which follows the Fresnel pane 2' and is used to ensure that the light from the screen 2 is emitted into a predetermined angle range. The light therefore propagates not only along the direction indicated by the arrows P1'-P3' but within the angle range, in such a way that the screen 2 provides a desired viewing angle range.

The surface 10A shown in FIG. 1 is in the form of an aspherically curved Fresnel mirror and is used to keep the incidence angle γ less than 60° when the image that is produced by means of the image module 4 is projected onto the screen 2.

The surface 10B as shown in FIG. 2 is in the form of an aspherically curved mirror and is used to keep the incidence angle γ less than 60° when the image that is produced by means of the image module 4 is projected onto the screen 2.

Figure 4:
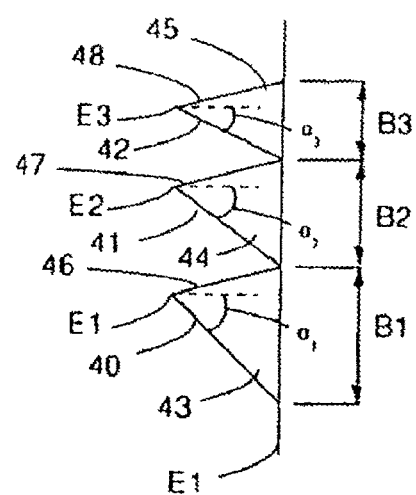
FIG. 4 shows an enlarged section illustration of a detail of the Fresnel mirror 10 from FIG. 1.

FIG. 4 shows, schematically, three mirror surface elements 40, 41, 42 of the Fresnel mirror 10, with the mirror surfaces 40, 41, 42 respectively being formed by the effective flank of the Fresnel structures 43, 44, 45, which have a triangular section. The other flanks 46, 47, 48 are not used for beam deflection and are therefore frequently referred to as disturbance flanks. The Fresnel structures 43-45 are in this case sections of rings whose center points coincide with the axis A, with the width B1, B2, B3, of the Fresnel structures (which in this case is in the region of 0.4 mm) decreasing as the distance from the axis A increases, as is indicated schematically in FIG. 4. Furthermore, the flank angle $\alpha_1$, $\alpha_2$, $\alpha_3$ of the mirror surface 40-42 relative to the optical axis (or to a straight line which runs parallel to the optical axis OA and through the left-hand corner E1, E2, E3 of the triangular section of the Fresnel structures 43-45) decreases as the distance from the optical axis OA increases (that is to say $\alpha_1 > \alpha_2 > \alpha_3$). In this case, the flank angle $\alpha_1$, $\alpha_2$, $\alpha_3$ corresponds to the tangent of the following function:

$$z = \frac{h^2}{R + R\sqrt{(1 - (1 + kfr)(h/R)^2)}} + \sum_{i=3}^{7} cfr_i \cdot h^i$$

where h is the distance of a point on the Fresnel structure 40, 41, 42 (for example the left-hand corner E1-E3) from the optical axis OA, R is the spherical curvature of the entire Fresnel mirror 10 and the parameters kfr and $cfr_i$ have the values indicated in the following Table 3.

TABLE 3

| Kfr | $cfr_3$ | $cfr_4$ | $cfr_5$ | $cfr_6$ | $cfr_7$ |
|---|---|---|---|---|---|
| $-1.324 * 10^{-1}$ | $1.659\,8\,10^{-8}$ | $2.592 * 10^{-10}$ | $-5.761 * 10^{-13}$ | $4.538 * 10^{-18}$ | $-1.533 * 10^{-19}$ |

The aspherical curvature of the surfaces 10B, 11, 13 and 14 can be described by the following aspherical equation:

$$z = \frac{h^2}{R + R\sqrt{(1 - (1+k)(h/R)^2)}} + \sum_{i=2}^{7} c_i \cdot h^{2i}$$

where h is the distance from the optical axis OA and z is the distance of the apex plane (the plane which is located at right angles to the optical axis OA and includes the intersection of the apex of the surface with the plane). The aspherical coefficients are indicated in the following Table 4 (Fresnel mirror) and Table 5 (second aspherical mirror) for the aspherical mirror 11 and for the aspherical surfaces 13 and 14, as well.

TABLE 4

| (Fresnel mirror) | | | |
|---|---|---|---|
| | 11 | 13 | 14 |
| k | $-4,000$ | $-8.761 * 10^{-1}$ | $-1.112$ |
| $C_2$ | $-2.904 * 10^{-8}$ | $-1.836 * 10^{-5}$ | $6.0664 * 10^{-5}$ |
| $C_3$ | $2.815 * 10^{-12}$ | $-1.538 * 10^{-7}$ | $-1678 * 10^{-7}$ |
| $C_4$ | $-2.616 * 10^{-16}$ | $1.5403 * 10^{-10}$ | $4.5332 * 10^{-11}$ |
| $C_5$ | $1.596 * 10^{-20}$ | $-4.163 * 10^{-14}$ | $-1.716 * 10^{-14}$ |
| $C_6$ | $-5.353 * 10^{-25}$ | $-6.037 * 10^{-17}$ | $-6.613 * 10^{-17}$ |
| $C_7$ | $7.510 * 10^{-30}$ | $-7.548 * 10^{-20}$ | $4,3103 * 10^{-20}$ |

TABLE 5

| (second aspherical mirror) | | | |
|---|---|---|---|
| | 106 | 11 | 13 | 14 |
| k | $-6.30732^{-01}$ | $-6.45387^{+00}$ | $-1.84093^{-02}$ | $-1.84461^{-01}$ |
| $C_2$ | $-5.051465^{-10}$ | $7.9883103^{-08}$ | $3.8377298^{-05}$ | $4.8625759^{-05}$ |
| $C_3$ | $7.7953907^{-16}$ | $-1.675562^{-12}$ | $-2.060821^{-08}$ | $3.5785669^{-08}$ |
| $C_4$ | $-5.503459^{-22}$ | $-2.548885^{-16}$ | $-3.255553^{-11}$ | $-1.259309^{-10}$ |
| $C_5$ | $1.4607170^{-28}$ | $1.8825237^{-20}$ | $1.1375744^{-14}$ | $-1.297596^{-13}$ |
| $C_5$ | $-5.560153^{-37}$ | $-4.606568^{-25}$ | $2.8410665^{-17}$ | $-1.613972^{-16}$ |
| $C_7$ | 0 | $3.2719385^{-30}$ | $-2.291234^{-20}$ | $-1.587835^{-19}$ |

Apart from the deflection by the planar mirrors 12 and 19, the projection optics are a rotationally symmetrical system whose image field is used only on one side. The deflection mirror 12 is tilted through 10° with respect to the optical axis, and the axis of the following three lenses (with the surfaces 13-18) is in consequence tilted through 20° with respect to the axis OA.

The deflection mirror 19 is tilted through 45° with respect to the optical axis OA such that the optical elements with the surfaces 20 to 36 are arranged one behind the other at right angles to the plane of the drawing in FIGS. 1 and 2.

In the described embodiment shown in FIG. 1, the Fresnel structures 43-45 are formed on a planar plane E1 (FIG. 3). However, it is also possible for the plane E1 to be curved (for example spherically or aspherically) such that the Fresnel structures 43-45 are in this case provided on the curved plane E1. The curved configuration of the plane E1 makes it possible, for example, to compensate for imaging errors in the projection optics 3.

Because of the described design of the projection optics and in particular because of the Fresnel mirror 10A or second aspherical mirror 10B, it is possible to produce a rear projection apparatus with a small physical depth T and a small foot height H, in which the screen may have a transparent Fresnel pane which extends over the entire screen area, since the maximum incidence angle of the light beams on the screen 2 or the Fresnel pane 2' is no greater than 60°. Since this can be ensured over the entire pane area, there is no longer any need to make the Fresnel pane of the screen reflective at least in one subarea. The projection apparatus according to the invention therefore provides an extremely compact projection apparatus with expert image characteristics.

Figure 5:
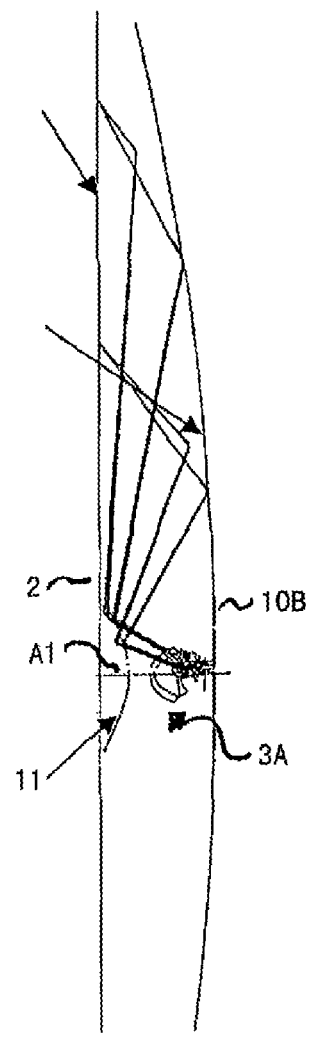
FIG. 5 shows a side view of the rear projection apparatus according to the invention with special projection optics.

FIG. 5 shows a side view of the rear projection apparatus according to a further refinement in which, in particular, it is possible to clearly see that the lens group, which may be regarded as output imaging elements (surfaces 112-115) of the projection optics, has the same optical axis as the first aspherical mirror 11. As can also be seen, both the first aspherical minor 11 and the second aspherical mirror 10B and the lens group of the output imaging elements of the projection optics have the same optical axis (A1). It can likewise be clearly be seen that the projection optics together with the first and the second aspherical mirror are in the form of a rotationally symmetrical system. As can also clearly be seen, the image field is used only on one side, as a result of which, for example, the part which is underneath the optical axis is not used, and the optical elements around this part can be shortened.

Figure 6:
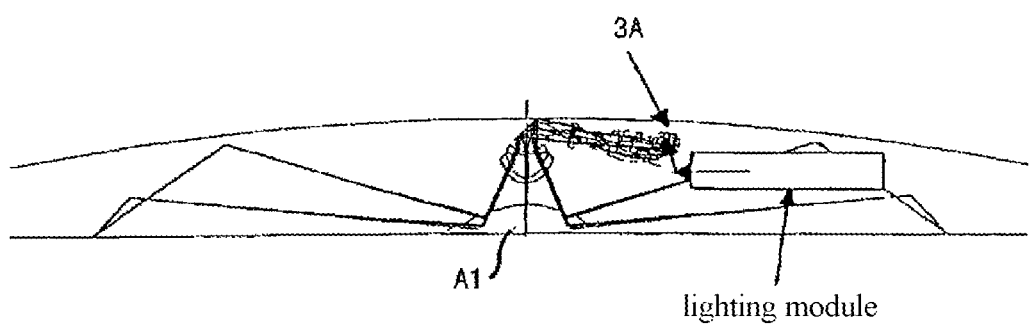
FIG. 6 shows a plan view of the rear projection apparatus according to the invention with a special arrangement of the projection optics.

FIG. 6 shows a plan view of the rear projection apparatus according to the application, from which it can clearly be seen that the deflection mirror which is located in the projection optics 3 is suitable for injection of images from the side, to be precise for example between the screen and the second aspherical minor, as a result of which the flat structure of the projection apparatus is a particular feature, although the image quality is still optimal. Because of the aspherical curvature of the second aspherical mirror, it is advantageous for the optical imaging elements of the projection optics which are located before and after the deflection mirror to be arranged such that, because of the deflection minor, the respective optical axes have an angle of less than or equal to 90°. This measure means that the depth of the rear projection apparatus is appropriately limited just on the basis of the optical characteristics and imaging prerequisites of the projection optics 3, of the first aspherical mirror and of the second aspherical mirror.

Figure 7:
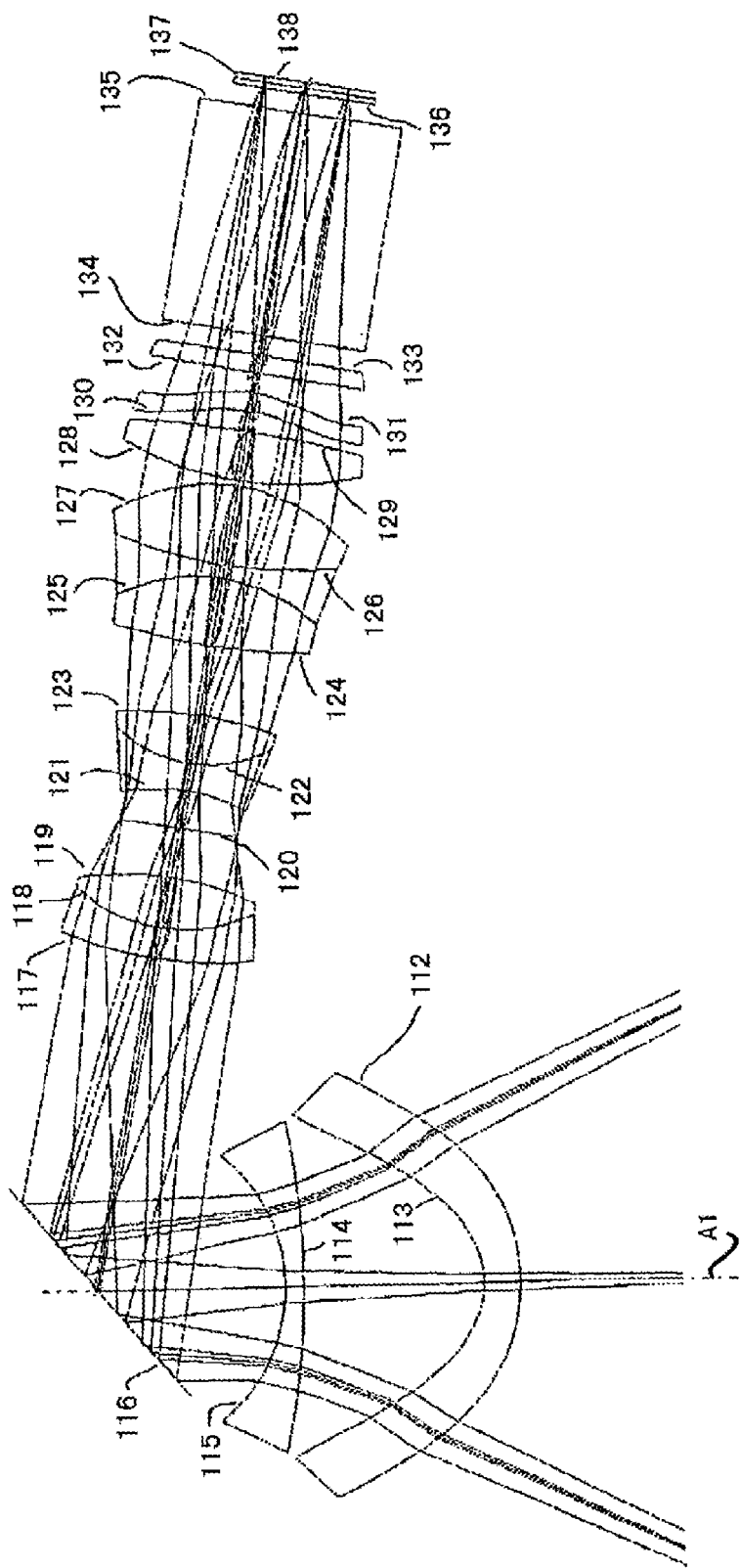
FIG. 7 shows a lens detail of the projection optics used in FIGS. 5 and 6.

FIG. 7 shows a lens section of a further embodiment of the part of the projection optics 3, clearly showing that the deflection mirror 116 subdivides the projection optics into two parts, specifically into input optics 117-138 and output optics 112-115 with output imaging elements which, in this case, are represented by two lenses with different surfaces. It should be stressed that the optical axis of the output imaging elements is chosen such that it is identical to the optical axis (A1) of the first aspherical mirror. The spatial characteristic and the interaction of the mirror and the second aspherical mirror are taken into account by the geometric arrangement of the subdivided parts of the projection optics. To be precise in such a way that the respective optical axes of the subdivided images have an angle of less than or equal to 90°. At this point, it should also be stressed that, for example, the element formed by the surfaces 134 and 135 can likewise be in the form of a deflection prism in order in this way, for example, to achieve total internal reflection of the image to be displayed.

Table 6 shows the distances and radii of curvature of the surfaces 112-138 of the elements of the projection optics 3A. The refractive power and the Abbe dispersion number are also indicated for the material, for the situation in which two surfaces bound a lens material. Radii, thicknesses and air distances are indicated in millimeters in the table. The explanatory notes relating to Tables 1 and 2 apply in a corresponding manner to the explanation of this table.

TABLE 6

| Surface | Radii | Thickness and air distances | Refractive powers $n_e$ | Abbe dispersion $v_e$ | Surface character-istic |
|---|---|---|---|---|---|
| | | 152 | | | |
| 10B | −4806 | | | | S, A |
| | | 113.3 | | | |
| 11 | 98.51 | | | | S, A |
| | | 28.3 | | | |
| 112 | 36.92 | | | | A |
| | | 6 | 1.52743 | 56.3 | |
| 113 | 15.227 | | | | A |
| | | 31.22 | | | |
| 114 | 144.98 | | | | |

TABLE 6-continued

| Surface | Radii | Thickness and air distances | Refractive powers $n_e$ | Abbe dispersion $v_e$ | Surface character-istic |
|---|---|---|---|---|---|
| | | 3 | 1.71615 | 53.4 | |
| 115 | 29.594 | | | | |
| | | 32.45 | | | |
| 116 | Infinite | | | | S |
| | | 59 | | | |
| 117 | 65.256 | | | | |
| | | 5.4 | 1.81264 | 25.22 | |
| 118 | 26.867 | | | | |
| | | 9.3 | 1.64268 | 44.59 | |
| 119 | −51.684 | | | | |
| | | 8.89 | | | |
| 120 | Infinite | | | | Aperture |
| | | 6.9 | | | |
| 121 | −32.737 | | | | |
| | | 4.98 | 1.77621 | 49.36 | |
| 122 | 22.122 | | | | |
| | | 9.03 | 1.79173 | 26.08 | |
| 123 | −66.673 | | | | |
| | | 12.49 | | | |
| 124 | 110.75 | | | | |
| | | 12.3 | 1.49845 | 81.14 | |
| 125 | −30.364 | | | | |
| | | 2.23 | 1.81264 | 25.22 | |
| 126 | 78.7 | | | | |
| | | 14.2 | 1.49845 | 81.14 | |
| 127 | −31.846 | | | | |
| | | 0.82 | | | |
| 128 | 55.72 | | | | |
| | | 8.87 | 1.49845 | 81.14 | |
| 129 | −201.5 | | | | |
| | | 3.45 | | | |
| 130 | −28.3 | | | | A |
| | | 3.2 | 1.52743 | 56.3 | |
| 131 | −24.78 | | | | A |
| | | 3.5 | | | |
| 132 | Infinite | | | | |
| | | 3 | 1.52514 | 58.36 | |
| 133 | Infinite | | | | |
| | | 3.5 | | | |
| 134 | Infinite | | | | |
| | | 40 | 1.74678 | 49.1 | Prism |
| 135 | Infinite | | | | |
| | | 3.5 | | | |
| 136 | Infinite | | | | |
| | | 1.05 | 1.51199 | 63.95 | Cover glass DMD |
| 137 | Infinite | | | | |
| | | 1.11 | | | |
| 137 | Infinite | | | | Image plane |

The aspherical curvatures of the surfaces 10B, 11, 112, 113, 130, 131 can also be described using the previous aspherical equation. The respective explanatory notes are also applicable in this case.

| | 10B | 11 | 12 | 13 | 30 | 31 |
|---|---|---|---|---|---|---|
| K | $2.4197^{+01}$ | $-4.2274^{+00}$ | $-2.6806^{+01}$ | $-1.5996^{+00}$ | $-4.9228^{+00}$ | $-2.4109^{+00}$ |
| $C_2$ | $-1.04183^{-10}$ | $-2.1194^{-08}$ | $6.34245^{-06}$ | $2.1059^{-05}$ | $1.30166^{-06}$ | $1.8414^{-05}$ |
| $C_3$ | $-2.48825^{-16}$ | $4.83535^{-12}$ | $5.90693^{-11}$ | $1.1855^{-08}$ | $1.3512^{-07}$ | $8.20518^{-08}$ |
| $C_4$ | $-7.9045^{-23}$ | $-6.6693^{-16}$ | $-7.25885^{-13}$ | $-1.1827^{-11}$ | $-4.3703^{-10}$ | $-2.1910^{-10}$ |
| $C_5$ | $-2.35554^{-28}$ | $5.50251^{-20}$ | $-7.75680^{-16}$ | $-1.7598^{-14}$ | $5.78845^{-13}$ | $8.58357^{-14}$ |

-continued

| | 10B | 11 | 12 | 13 | 30 | 31 |
|---|---|---|---|---|---|---|
| $C_6$ | $2.38915^{-34}$ | $-2.3926^{-24}$ | $2.44678^{-19}$ | $8.62453^{-19}$ | $-3.7455^{-16}$ | $7.23787^{-18}$ |
| $C_7$ | 0 | $4.04510^{-29}$ | $-7.58065^{-23}$ | $8.6376^{-21}$ | $2.015^{-19}$ | $3.20618^{-19}$ |

In principle, it can be stated that the embodiment shown in FIGS. 5 to 7 in principle has the advantage, in particular with regard to the projection optics, that there is no need to use a mirror for deflection downward between the projection optics and the first aspherical mirror, thus resulting in particular in a small physical height. In principle, only one deflection by the deflection mirror or planar mirror is carried out on the basis of the presence of the deflection mirror. These projection optics furthermore achieve the advantage that the output imaging elements are arranged further from the aperture, and can therefore be used particularly well for optical images.

What is claimed is:

1. A projection apparatus, comprising:
   an image-producing element for producing at least one image;
   projection optics comprised of free-form areas for magnifying and reflecting the image toward an viewer for observation, wherein the projection optics comprises at least a first mirror and a second mirror, the image is reflected by the first mirror and the second mirror in succession, no deflection mirror is disposed between the viewer and the second mirror, and the first mirror and the second mirror are in the form of a non-rotationally symmetrical system;
   a field lens disposed between the image-producing element and the first mirror for transmitting the image;
   an aperture stop disposed between the field lens and the first mirror;
   a first lens group with refractive power disposed between the field lens and the aperture stop; and
   a second lens group with refractive power disposed between the aperture stop and the first mirror.

2. The projection apparatus as claimed in claim 1, wherein the second lens group comprises at least two meniscus lenses.

3. The projection apparatus as claimed in claim 1, wherein the first lens group comprises at least one cemented lens.

4. The projection apparatus as claimed in claim 1, wherein the second lens group comprises at least one cemented lens.

5. The projection apparatus as claimed in claim 1, wherein the first lens group has positive refractive power.

6. The projection apparatus as claimed in claim 1, wherein the first lens group comprises:
   a first lens having positive refractive power disposed between the field lens and the aperture stop; and
   a second lens having negative refractive power disposed between the first lens and the aperture stop.

7. The projection apparatus as claimed in claim 1, wherein a lens nearest the first mirror in the second lens group has negative refractive power.

8. The projection apparatus as claimed in claim 1, further comprising:
   a deflection mirror disposed between the aperture stop and the first mirror.

9. The projection apparatus as claimed in claim 1, wherein the field lens, the aperture stop, the first lens group and the second lens group are in the form of a rotationally symmetrical system.

10. A projection apparatus, comprising:
    an image-producing element for producing at least one image;
    projection optics comprised of free-form areas for magnifying and reflecting the image toward an viewer for observation, wherein the projection optics comprises at least a first mirror and a second mirror, the image is reflected by the first mirror and the second mirror in succession, no deflection mirror is disposed between the viewer and the second mirror, and the first mirror and the second mirror are in the form of a non-rotationally symmetrical system;
    a deflection prism disposed between the image-producing element and the first mirror for transmitting the image;
    an aperture stop disposed between the deflection prism and the first mirror;
    a first lens group with refractive power disposed between the deflection prism and the aperture stop; and
    a second lens group with refractive power disposed between the aperture stop and the first mirror.

11. The projection apparatus as claimed in claim 10, wherein the second lens group comprises at least one meniscus lens.

12. The projection apparatus as claimed in claim 10, wherein the first lens group comprises at least one cemented lens.

13. The projection apparatus as claimed in claim 10, wherein the second lens group comprises at least one cemented lens.

14. The projection apparatus as claimed in claim 10, wherein the first lens group has positive refractive power.

15. The projection apparatus as claimed in claim 10, wherein the first lens group comprises:
    a first lens having positive refractive power disposed between the deflection prism and the aperture stop; and
    a second lens having negative refractive power disposed between the first lens and the aperture stop.

16. The projection apparatus as claimed in claim 10, wherein the first lens group comprises two consecutively arranged lenses having positive refractive power.

17. The projection apparatus as claimed in claim 10, wherein a lens nearest the first mirror in the second lens group has negative refractive power.

18. The projection apparatus as claimed in claim 10, further comprising:
    a deflection mirror disposed between the aperture stop and the first mirror.

19. The projection apparatus as claimed in claim 10, wherein the deflection prism, the aperture stop, the first lens group and the second lens group are in the form of a rotationally symmetrical system.

* * * * *